United States Patent [19]
Lindow

[11] 3,854,551
[45] Dec. 17, 1974

[54] TREE STAND AND SEAT

[76] Inventor: Gerald L. Lindow, 175½ E. North Water St., Nennah, Wis. 54956

[22] Filed: Dec. 5, 1973

[21] Appl. No.: 421,857

[52] U.S. Cl. .............................................. 182/187
[51] Int. Cl. ............................................... A47c 9/10
[58] Field of Search ............ 182/187, 82, 214, 111, 182/107, 108

[56] References Cited
UNITED STATES PATENTS

| | | | |
|---|---|---|---|
| 1,712,974 | 5/1929 | Venard | 182/187 |
| 3,115,213 | 12/1963 | Cloutier | 182/187 |
| 3,358,789 | 12/1967 | Laun | 182/187 |
| R20,653 | 2/1938 | Lamb | 182/187 |

*Primary Examiner*—Reinaldo P. Machado

[57] ABSTRACT

A tree stand and seat which is readily portable in a collapsed folded position and opened in a manner to be readily attached to a tree in a manner not damaging the tree and to provide a platform projecting horizontally from the tree which may be used as a seat or a stand and which is intended for use in the woods by hunters, campers and the like. The stand includes a platform which projects horizontally from the tree, a belt secured to one edge of the platform and adapted to wrap around the trunk of the tree to secure the platform thereto, a safety rope attached to the same edge of the platform as the strap and adapted to wrap about a portion of the tree trunk above the portion engaged by the strap to assist in retaining the platform to the tree, and a support bracket depending downwardly from the platform and adjustable to engage the circumference of various tree diameters to support the platform on the tree.

4 Claims, 5 Drawing Figures

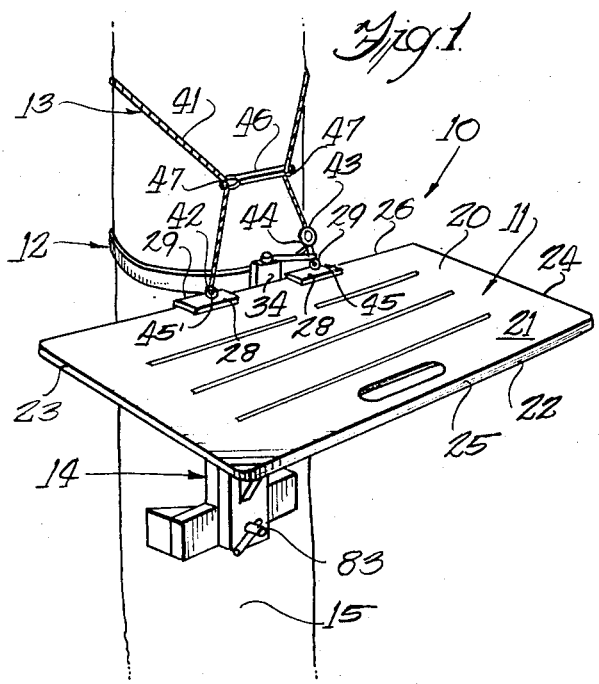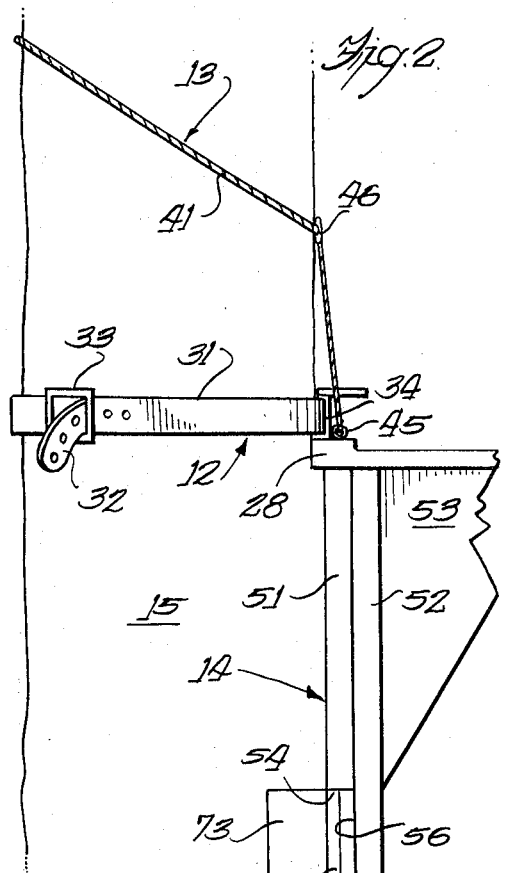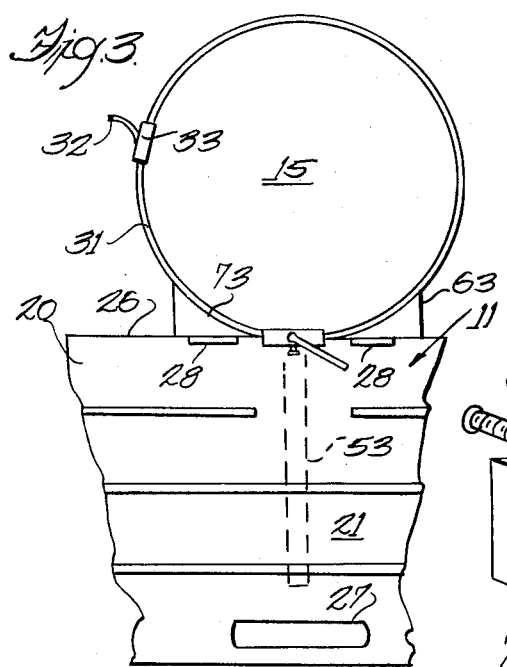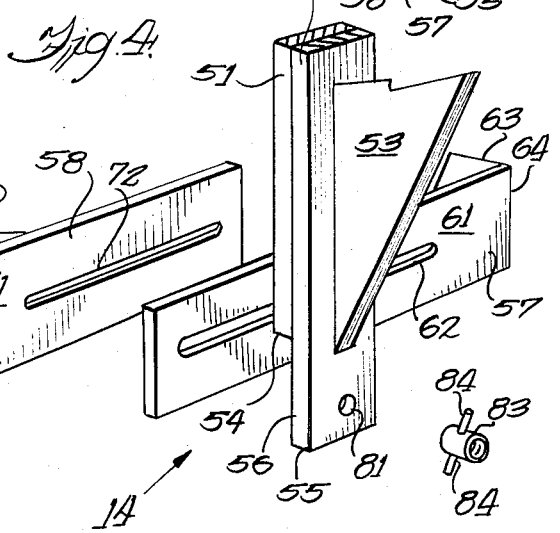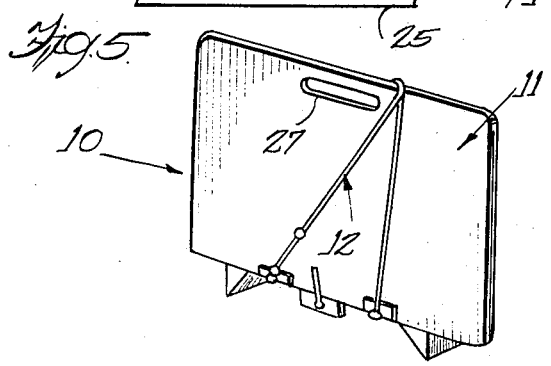

TREE STAND AND SEAT

BACKGROUND OF THE INVENTION

1. Field of the Invention

This invention relates generally to portable seats and stands and more particularly to a novel combination stand and seat intended for use by hunters, campers and the like in the woods and adapted to be readily supported from a tree or other upstanding support in a manner to provide a stand, seat or combination of both for the hunter at any desired level on the tree or other upstanding support.

2. Description of the Prior Art

In the sport of hunting, there is involved considerable hiking through open country and woods during which the hunter must conveniently carry all equipment required in the hunt, with it being desirable from time to time for the hunter to have a seat to rest on while awaiting the approach of game, and also it being desirable for the hunter to have a stand to stand on to await the approach of game. A seat and stand for such purposes must be light and have as little bulk as possible to provide for ease of transport by the hunter, while at the same time, it must have adequate strength and stability for use by the hunter.

In the providing of a suitable seat and stand certain difficulties are encountered when it is realized that the positions that a hunter normally occupies is disposed among logs, rocks, and bare ground which are often uncomfortable or damp such that they are not truly suited for the hunter to sit and rest thereon comfortably. Further, such terrain makes it quite difficult to find suitable ground to establish a seat or a stand thereon in a stable manner for use by the hunter.

SUMMARY OF THE INVENTION

The present invention recognizes the plight and needs of the hunter and provides a novel solution thereto in the form of a combined tree stand and seat which is readily folded to a compact size and is adapted to be supported from a tree or other upstanding support thus eliminating any need for supporting legs as well as eliminating the problem of having to find even ground as would be necessary for a seat provided with the usual type of legs.

Further, the present invention provides a novel collapsible and readily transportable combination seat and stand structure that is quickly made ready and quickly mounted upon a tree or the like for support without injury to the tree, and is quickly removed from the tree for further transportation.

It is a feature of the present invention to provide a combination tree stand and seat which may be readily attached to a tree at any point on the tree above the ground level to serve as a seat or a stand for a hunter on the tree, such as by attaching the seat at knee to waist level for the temporary seating and resting of the hunter thereon; or attaching the seat at chest level to provide a stand-up type snack bar or a handy surface for storing equipment thereon while the hunter is preparing his gear for use; or to attach the seat well above head level for use as a look-out stand to elevate the hunter well above ground level for a better position to locate game as well as providing a better position for shooting such game with a bow and arrow or the like.

Still a further feature of the present invention provides a portable tree stand and seat which is adapted for temporary mounting on a tree without injuring the tree and which is made more secure on the tree by the weight of a hunter sitting or standing thereupon which enhances the supporting grip of the seat on the tree.

Yet still a further feature of the present invention provides a readily portable tree stand and seat which is easily carried by a hunter and which may be easily mounted on a tree trunk at any desired level thereon providing both a seat and a stand for the hunter at properly spaced levels on the tree.

The provision of a tree stand and seat, such as briefly outlined above, and possessing the stated advantages, constitutes the principal features and advantages of the present invention. The provision of a tree stand and seat which is relatively simple in its construction and which therefore may be readily manufactured at a relatively low cost and by simple manufacturing methods; one which is made with a minimum of moving parts and which therefore is unlikely to get out of order; one which is rugged and durable and which therefore may be guaranteed by the manufacturer to withstand many years of rough usage; one which is easy to use and efficient in operation; one which may be readily and quickly attached to and detached from a tree or other vertical upstanding support; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a tree stand and seat of the present invention attached to a tree;

FIG. 2 is a side elevational view of the tree stand and seat attached to the tree;

FIG. 3 is a fragmentary top plan view of the tree stand and seat attached to the tree;

FIG. 4 is an enlarged fragmentary perspective view illustrating the support bracket associated with the tree stand and seat; and FIG. 5 is a perspective view of the tree stand and seat in the collapsed folded position ready for transportation by the hunter.

DESCRIPTION OF THE PREFERRED EMBODIMENT

Referring now to the drawings in detail there is illustrated a preferred form of a tree stand and seat constructed in accordance with the principles of the present invention and designated generally in its entirety by the reference numeral 10, the stand being comprised of four component parts, namely a platform 11, a strap 12, a safety rope 13, and a support bracket 14. The stand 10 is intended for mounting on a tree 15 or other upstanding support, such as a post or the like, in a manner such that the platform provides both a seat and a stand for the hunter at any desired level on the tree or post above the ground.

The platform 11 is formed of a substantially flat rectangularly shaped body member 20 having a top surface 21, a bottom surface 22, opposed side edges 23 and 24, a front edge 25, and a back edge 26. An elongated slot 27 is provided adjacent front edge 25 and provides a convenient carrying handle for the stand 10. A pair of horizontally spaced apart tree engaging members 28 are secured at spaced locations on the back edge 26 inwardly from opposed side edges 23 and 24 and include tapered outermost edges 29 which diverge outwardly from the platform back edge 26 in a manner to engage the circumference of the tree 15.

The strap or belt 12 is formed of a flexible strap element 31 having a free terminal end 32 and an opposite terminal end 33 having a buckle fixedly attached thereto, the buckle adapted to receive the free terminal end 32 therethrough in a manner to retain the same temporarily therein, with the strap 31 being secured intermediate its terminal ends to the back platform edge 26 at a position thereon intermediate members 28, such point being designated by reference numeral 34. The strap 12 is adapted to be wrapped about the circumference of the tree 15 with terminal 32 inserted through buckle 33 and the strap tightened in a manner to tightly engage the tree circumference, the buckle 33 retaining the strap end 32 therethrough until otherwise manually released by a hunter.

The safety rope 13 is formed of a single elongated length of rope or cable 41 having one end 42 secured to one of the support members 28, the cable adapted to be wrapped about the circumference of the tree 15 at a position above the level of the strap 12 about the tree, with the opposite end 43 of the cable having a fastener 44 secured thereto and adapted to engage a hook 45 provided in the remaining support member 28. A rope tightening member 46 is provided with hook like members 47 formed at each end thereof and adapted to engage each of the terminal end portions of the rope 41 at a position above members 28 to tighten the rope, the tightening member 46 being shorter in longitudinal length than the spacing between the hooks 45 and 45' on the support members 28.

The support bracket 14 includes a pair of juxtapositioned vertical upright members 51 and 52 having the top end portions thereof detachably fastened to the bottom surface 22 and back edge 26 of platform 11 by any suitable fasteners, with a triangular bracing member 53 attached to a surface of upright 52 and projecting outwardly therefrom to engage the central portion of platform bottom surface 22 intermediate side edges 23 and 24. The terminal end 54 of upright 51 extends vertically downward from platform 11 a distance less than the length of upright 52 which extends to terminal end 55, this difference in vertical length defining a recess type surface 56. A pair of horizontally extending tree engaging members 57 and 58 are provided, member 57 having a rectangularly shaped base 61 with an elongated slot 62 disposed longitudinally therethrough and with a triangularly shaped wedge member 63 affixed to an outer end portion 64 thereof. Member 58 is provided with a rectangularly shaped elongated base 71 having an elongated slot 72 extending longitudinally therethrough and a triangularly shaped wedge member 73 affixed to the exterior surface of the outer end 74 of the base. The bases 61 and 71 are disposed in juxtaposition with the slots 62 and 72 in overlying alignment, the thickness of the combined bases corresponding to the thickness of upright 51 with the width of the bases corresponding to the length of the recess 56, the members 57 and 58 being received in the recess 56 with the slots 62 and 72 aligned with an opening 81 extending through upright 52. The members 57 and 58 are longitudinally adjustable relative to each other to vary the spacing between wedge members 63 and 73 to adjust the same for the circumference of different sized trees, the members being held together by a bolt 82 which is inserted through the aligned slots 72 and 62 and then through opening 81 after which the bolt is secured in place by a threaded nut 83 having laterally projecting handles 84 thereon for use in the tightening and loosening of the nut on the bolt.

As seen in FIG. 5, the stand 10 is readily disassembled and secured for ease of carrying by a hunter by use of the slot forming handle 27, the same being rapidly and conveniently opened and attached to a tree for use as a seat or stand thereon. It is to be understood that the stand 10 may be installed at any point on a tree or similar upright support, such as a post or the like, such as a hunter attaching the stand at knee to waist level to provide a temporary seat; or to attach the stand at approximately chest level to form a stand-up snack bar or a handy surface for storing equipment while the hunter is preparing his gear for use; or to place the stand well above head level for use as a look-out position to spot game, to provide a better position for the shooting of game with a bow and arrow or the like, or to merely provide a stand for the placing of equipment and food or the like out of reach of inquistive animals and the like.

In operation, safety rope 13 is passed about the circumference of a tree 15 with the hook 44 engaging holder 45 on member 28, after which the strap 12 is secured about the tree circumference, after which rope tightening member 46 is applied to the rope 13 to tighten the same about the tree. The wedge members 57 and 58 are then adjusted such that the wedges 63 and 73 engage the tree circumference, after which the nut 83 is tightened to retain the members in the tightened adjusted position. The stand 10 is now ready for use.

It is to be noted that the strap 12 and rope 13 prevent any downward movement of the platform 11 relative to the tree, and that when the strap is slung around the tree it results in a grip that is sufficient to support the platform since, upon use of the platform and a hunter applying his weight thereto, the seat tends to further tension the strap by the slight downward movement of the platform caused by the weight of the hunter thereon, this providing a non-slip grip on the tree trunk in conjunction with the safety rope binding on the tree trunk.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A combination stand and seat adapted for support from a tree or other upstanding support comprising a substantially flat rectangularly shaped platform having a top surface, a bottom surface, a front edge, a back edge, and opposed side edges, an elongated slot formed in the platform adjacent the front edge thereof and defining a handle carrying member for use in the transporting of the stand between locations of usage, a flexible strap affixed intermediate its terminal ends to the back edge of said platform and adapted to be slung about the circumference of the tree in a manner to retain the platform secured to the tree, a flexible safety rope having one end affixed to the platform adjacent the back edge thereof with the opposite end adapted to be passed about the circumference of the tree at a level above the position of the strap about the tree, the free end of said rope adapted to be releasably secured to said back edge of said platform at a position spaced apart from the opposite end of said rope, a vertically extending support bracket affixed at its top end to the back edge and bottom surface of said platform with said bracket extending vertically downwardly therefrom to terminate at a terminal edge, a pair of horizontally disposed wedge forming members adjustably secured to the terminal edge portion of said bracket and extending laterally outwardly of opposite sides of said bracket, and means adjustably retaining said wedge members in adjusted positions relative to each other to engage the circumference of the tree for stabilizing and supporting said platform on said tree.

2. The tree stand as set forth in claim 1 wherein said strap comprises a flexible length of belt-like material having a pair of terminal edges, one terminal edge being a free edge, the opposite terminal edge having a buckle affixed thereto and adapted to receive the free edge of the belt in a retaining manner therethrough, said belt adapted to pass about the circumference of the tree with the free edge passing through said buckle in a manner to tighten the belt about the circumference of the tree with the buckle retaining the belt in the tightened position.

3. The stand as set forth in claim 2 further comprising a rope tightening member adapted for use with the safety rope and comprising an elongated body member having opposed ends, a hook member defined at each end of said body member, each of said hook members adapted to engage an associated terminal end portion of safety rope at a position above the point where the ends of the rope are joined to said platform after said rope has been passed about the tree circumference.

4. The stand as set forth in claim 3 wherein each of the wedge members are substantially identical in size and configuration, each wedge member including a rectangularly shaped elongated base having an inner and an outer face surface and an inner and an outer end, a triangularly shaped wedge member affixed to the outer face surface of each base adjacent the outer edge thereof, and a longitudinally elongated slot defined in each base, the outer face surface of one base adapted to be juxtapositioned with the inner face surface of the second base with said slots in each base in overlying alignment with each other and with said wedge members disposed in horizontally spaced apart positions, and said means for securing said members in an adjustable position comrising an elongated bolt adapted to pass through said aligned slots in said first and second wedge members and thence pass through an opening in the terminal end portion of said bracket, and a nut threadedly engaging the end of said bolt after passing through said bracket to adjustably tighten and loosen said bolt for selectively adjusting and tightening said wedge members in said adjusted position.

* * * * *